United States Patent [19]

Follett

[11] 4,128,105
[45] Dec. 5, 1978

[54] AUTOMATIC SHUT-OFF VALVE AND METHOD OF OPERATION THEREOF

[76] Inventor: John L. Follett, 14554 Richmond Ave., Fair Haven, N.Y. 13064

[21] Appl. No.: 694,206

[22] Filed: Jun. 9, 1976

Related U.S. Application Data

[63] Continuation-in-part of Ser. No. 538,537, Jan. 6, 1975, abandoned, which is a continuation-in-part of Ser. No. 322,735, Jan. 11, 1973, abandoned.

[51] Int. Cl.² .................... F16K 17/28; F16K 17/38
[52] U.S. Cl. .......................................... 137/1; 137/73; 137/270; 137/498; 137/519; 137/533.27; 251/65
[58] Field of Search .................... 137/72–77, 137/460, 498, 509, 519, 533.27, 1; 251/65

[56] References Cited

U.S. PATENT DOCUMENTS

| | | | |
|---|---|---|---|
| 1,026,471 | 5/1912 | Siefken | 137/519 X |
| 1,986,358 | 1/1935 | Rasbridge | 137/519 |
| 2,167,938 | 8/1939 | Clemmons | 137/519 X |
| 2,745,725 | 5/1956 | Ward et al. | 137/519 |

Primary Examiner—Martin P. Schwadron
Assistant Examiner—Richard Gerard
Attorney, Agent, or Firm—Charles S. McGuire

[57] ABSTRACT

A valve having a closure element in the form of a tapered plug normally maintained by gravity on a vertical rod extending loosely into a bore in the plug. Flow of fluid through the valve in excess of a predetermined rate acts on a flow-responsive surface of the plug to move the latter into engagement with a valve seat, thus blocking further flow. The construction is particularly suited to close control of the flow rate at which closure of the valve occurs. The size, shape, weight and position of various elements influences the magnitude of the flow rate required for closure and may be tailored to effect closure repeatedly at a virtually exact desired flow rate. One embodiment includes means for selectively changing the shape of the flow-responsive surface, and thereby the flow rate at which closure occurs. In the preferred embodiment, the closure element is retained in the closed position by a permanent magnet until intentionally reset by external means, such as the application of a back pressure from the downstream side of the closure element sufficient to overcome the magnetic attraction. The invention also resides in the method of operating the preferred embodiment of the valve by effecting reset with application of a back pressure from external means.

9 Claims, 4 Drawing Figures

U.S. Patent  Dec. 5, 1978  4,128,105

AUTOMATIC SHUT-OFF VALVE AND METHOD OF OPERATION THEREOF

REFERENCE TO RELATED APPLICATIONS

The present application is a continuation-in-part of U.S. Application Ser. No. 538,537, which was a continuation-in-part of U.S. Application Ser. No. 322,735, both of said prior applications now abandoned.

BACKGROUND OF THE INVENTION

The present invention relates to safety valves and, more particularly, to improvements in shut-off valves responsive to a rate of flow in excess of a predetermined value.

Valves are interposed in supply lines for liquid or gaseous fuels, and the like, to act as safety devices shutting off the flow when an unsafe condition exists. For example, if the volumetric flow rate of the gas exceeds a certain magnitude it is desirable to have some means of automatically shutting off the flow until the condition which caused the excess flow has been corrected. Since the failure to shut off flow under such conditions may result in loss of lives or property, it is imperative that the safety valve close reliably at the desired flow rate.

In utility gas service lines, it is desirable to install a safety shut-off valve relatively near the gas main, at least somewhat remote from the point of actual usage of the gas. In this way, the valve will not be damaged or fail to operate because of structural damage to the building where the gas is used, and may be installed below ground level to prevent malfunction due to tampering or other misuse. However, it is inconvenient or impossible to reset such valves because of their inaccessible location. Accordingly, it is commonly necessary to replace the safety shut-off valve with a new valve once it has been closed.

It is an object of the present invention to provide a novel and improved automatic shut-off valve operable in response either to excess flow of gas through the valve, or to the presence of other unsafe conditions, such as excessive temperatures.

Another object is to provide a basic valve design which may be tailored, by proper selection of the size, weight and other physical features of certain elements, to close in response to the flow rate through the valve exceeding any desired value.

A further object is to provide a safety shut-off valve having a single movable element which will operate repeatedly to close at a predetermined flow rate, within very close tolerances, when the pressure of the gas flowing through the valve is relatively low.

Still another object is to provide a safety shut-off valve movable to, and retained in, a closed position until reset by external means wherein the valve may be installed underground, or in an otherwise inaccessible position and reset from a remote location.

A still further object is to provide a method of operating a safety shut-off valve which includes resetting to the open position from a remote location in a simple and rapid manner.

Other objects will in part be obvious and will in part appear hereinafter.

BRIEF SUMMARY

A valve housing is interposed in a fluid supply line and includes a fixed valve seat between inlet and outlet openings. A closure element in the form of a tapered plug is disposed below the seat and normally maintained by gravity in a position spaced from the seat to allow flow therethrough. A vertical rod extends loosely into a bore in the closure element, the latter being lifted into engagement with the seat to block flow by action of the fluid on a flow-responsive surface of the closure element.

A permanent magnet is preferably associated with one and a magnetically permeable material with the other of the fixed valve body and the movable closure element to maintain the tapered plug in the closed position until intentionally reset by other means. A further modification includes a spring biased element retained in an initial position by a heat softenable material. When the spring force overcomes the retaining force of the material, the element is moved to engage the tapered plug and carry it to the closed position, whereby the valve is responsive to excess heat as well as excess flow.

The basic valve design, although simple and economical, is extremely versatile since the weight, dimensions and shape of the tapered plug may be tailored to allow closure at virtually any desired flow rate. That is, for any given combination of such physical parameters, the valve will close when the rate of flow therethrough reaches a predetermined value, and is repeatable within very close tolerances.

DETAILED DESCRIPTION

Figure 1:
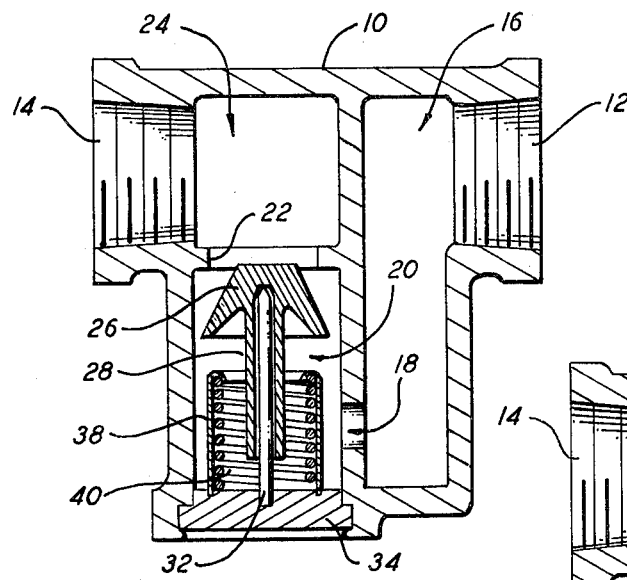
FIG. 1 is a front elevational view in half section showing a first embodiment of the valve in the open position.

Valve body 10, in the form shown, is adapted for connection in a straight gas line, or the like, such as a domestic natural gas supply line. Threaded connections are provided for the inlet line at 12 and the outlet line at 14. Inlet chamber 16 communicates through opening 18 with flow control chamber 20 near the lower end thereof. Fixed valve seat 22 provides an opening at the upper end of flow control chamber 20 through which the latter communicates with outlet chamber 24.

A valve closure element in the form of a tapered plug 26 having downwardly extending, integral shank portion 28 is arranged in flow control chamber 20. A bore extends through shank portion 28 and into tapered plug 26, terminating short of the smaller diameter end thereof. The bore is denoted by reference numeral 30 in FIG. 3, where the closure element is shown in the closed position. Rod 32 is fixedly anchored in plug 34 which seals the lower end of flow control chamber 20 by threaded or force-fit connection in the opening in valve body 10. The bore is of slightly greater diameter than rod 32, whereby the valve closure element is freely slideable on the rod. Preferably, the tip of rod 32 tapers to a sharp point to minimize the area of contact between the rod and plug, thereby reducing the possibility of malfunction by the plug sticking to the rod by corrosion or other causes.

Gas entering control chamber 20 through opening 18 will flow over and around tapered plug 26, exerting an upward force thereon in accordance with the rate of flow of the gas. One of the principal factors influencing the particular flow rate at which closure occurs is the configuration of the downwardly disposed surface of the closure element. In the FIG. 1 embodiment, this surface tapers downwardly and outwardly from its upper end, as does the upwardly disposed surface. The closure element will be maintained by gravity on rod 32, spaced from valve seat 22, in the position shown in FIG. 1 until the rate of flow increases to a level at which the force on the flow-responsive surfaces of the closure element is sufficient to lift it toward the seat. When the upwardly disposed surface of tapered plug 26 contacts seat 22, flow is completely blocked.

In the FIG. 1 embodiment, when the closure element is moved by a flow rate in excess of the maximum desired rate into contact with valve seat 22, it will be maintained in the closed position by pressure of the gas on the inlet side. After correcting the condition which resulted in the excess flow and equalizing the pressure on each side of the valve seat, the latter will return by gravity to the open position, as shown in FIG. 1.

Figure 2:
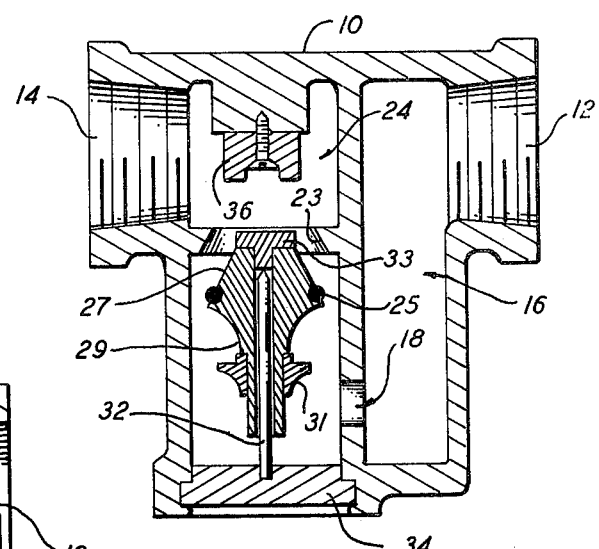
FIGS. 2 and 3 are full elevational views in half section showing another embodiment of the valve in the open and closed positions, respectively.
Figure 3:
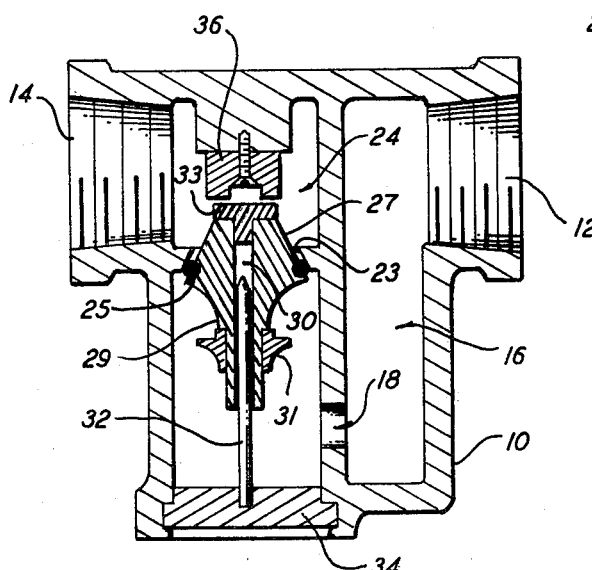

In the embodiment of FIGS. 2 and 3, means are provided for retaining the closure element in the closed position until intentionally reset by other means. In this embodiment, the tapered plug closure element 27 has a somewhat different configuration of the downwardly disposed, flow responsive surface and is provided with O-ring 25 in an annular groove in the upwardly disposed surface of the plug. The valve seat is also of slightly different configuration, having a radius on its annular surface and being denoted in this embodiment by reference numeral 23. Integral shank portion 29 extends downwardly from tapered plug 27 and flow control element 31 is removably mounted thereon, for example, by frictional engagement of the shank portion with the interior of an opening through the control element. It will be noted that the upwardly and downwardly disposed surfaces of control element 31 are of different shapes. Since the downwardly disposed surface is directly in the path of fluid flow, it constitutes at least a portion of the flow-responsive surface of the closure element, the downwardly disposed surface of plug 27 also having some effect on flow response characteristics. Control element 31 may be mounted upon shank portion 29 with either of its opposing surfaces disposed downwardly, thereby allowing selective change of the flow response characteristics of the valve.

Another feature of the embodiment shown in FIGS. 2 and 3 is that bore 30 initially extends completely through shank portion 29 and tapered plug 27. Element 33 includes on one side a centrally disposed stem which is pressed into the end of bore 30 at the small diameter end of tapered plug 27, thereby affixing element 33 to the plug. Element 33 is of a magnetically permeable material, tapered plug 27 preferably being of nonmagnetic material, such as brass. Permanent magnet 36 is affixed within outlet chamber 24, above valve seat 22. The magnetic attraction exerted on element 33 when an excess flow condition moves closure element 27 toward the closed position is sufficient to hold the closure element in the fully closed position. It will be noted in FIG. 3 that the plug, or element 33 associated therewith, does not touch the magnet when the valve is closed, thereby eliminating the need for close tolerances in positioning the magnet, which is the preferred construction. Although the use of O-ring 25 is optional, contact thereof with valve seat 23 insures a tight seal due to the somewhat resilient nature of the O-ring material. If used, the O-ring may be associated with either the closure element, as shown, or with the valve seat.

The magnet is particularly desirable in applications wherein the gas is under low pressure (e.g., 5 inches water column) at the inlet side. Since this is the principal intended application of the invention, the embodiment utilizing the magnet is the preferred construction. When such a valve is installed in a normal utility gas service line, typically having 50 feet or more of line downstream of the valve, there is a momentary surge of back pressure on the outlet side of the valve following closure which may exceed a low inlet pressure. The valve will then re-open if only inlet pressure is used to hold it closed. When flow resumes, the valve will again close, and the back pressure surge will again cause it to re-open, and so on. The use of a magnet exerting a strong enough attraction on the closure element to offset the force of the back pressure encountered on valve closure will insure that the valve remains closed even with very low pressure at the inlet side. Preferably, the magnetic attraction is strong enough that once moved to the closed position, the closure element will not be dislodged by the normal back pressure encountered upon closure even though exposed only to atmospheric pressure on the inlet side. A back pressure somewhat in excess of that normally encountered upon closure must be intentionally applied in order to exceed the force of magnetic attraction and reset the closure element in the open position, as will be further explained later herein. It should be noted that the permanent magnet may be associated with the movable closure element and the magnetically permeable material with the valve seat, or other fixed portion of the valve body, if desired. Also, the magnet may be incorporated in the valve of FIG. 1 and used with the tapered plug shown therein, or with closure elements of other configurations.

In addition to being responsive to predetermined flow conditions, the valve may be responsive to other unsafe conditions, such as excess heat. The embodiment of FIG. 1 includes a hollow cylindrical element 38 having a diameter less than the larger diameter end of tapered plug 26. The upper edge of element 38 forms a lip which is contacted by the upper end of spring 40. The spring is held in compression, exerting a biasing force on element 38 in an upward direction, by embedding the lower edge of element 38 in a fusible material such as solder in an annular groove in plug 34. When the heat to which valve body 10 is exposed reaches a level sufficient to soften the solder to a degree that the spring force will move element 38 upward, the closure element will be moved thereby to the closed position.

The basic valve design disclosed herein is adaptable to operate under a wide variety of flow conditions by control of the physical parameters of the tapered plug and its position relative to the walls of the flow control chamber. Variations in the configuration of the wall of flow chamber 20 near valve seat 22 will also vary the conditions at which the valve closes. For example, the valve will close at a lower rate of flow if tapered plug 26 is positioned closer to the seat, other factors remaining constant; increasing the weight of the plug will increase the flow rate required for closure; the closer the outer diameter of the plug to the chamber wall, the lower the flow rate which will produce closure, etc. Also, the shape of the plug, principally the downwardly facing surface upon which flow directly impinges is a significant factor in determining the flow conditions at which closure occurs. Once the physical parameters are established, the valve will operate precisely, or within very close limits, at one particular flow condition and will operate repeatedly at such condition. Where a magnet is used to maintain the plug in the closed position, reset may be effected by applying a sufficient degree of back pressure from a downstream point on the outlet side of the plug. Since the space between the largest diameter of the plug and the wall of the chamber in which it is disposed must be controlled in order to determine the flow rate at which closure occurs, the wall of the flow control chamber must either be cylindrical or tapered toward the outlet end; that is, it cannot have a cross sectional dimension larger at an intermediate point than at either end since the plug must be inserted through the inlet or lower end and must therefore be smaller than this end while still being positioned in close proximity to the wall in its installed initial position, spaced from the valve seat. Of course, if the valve seat is fabricated separately from the valve body and later assembled therewith, the closure element may be inserted through what becomes the outlet end of the valve body prior to positioning the seat therein.

Figure 4:
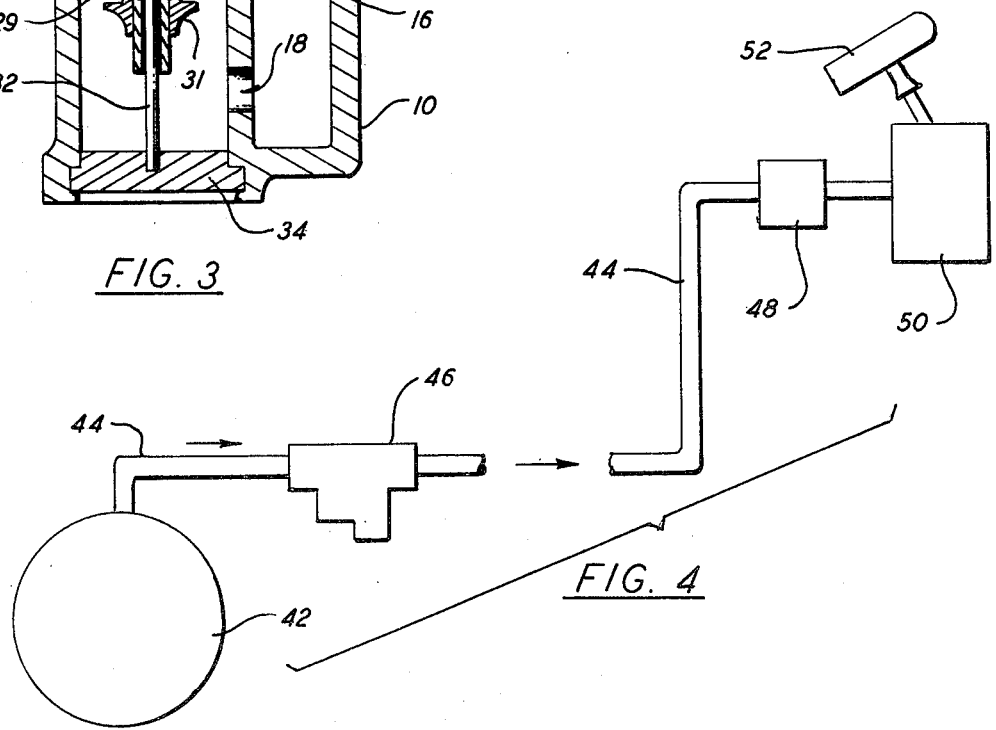
FIG. 4 is a somewhat diagrammatic showing of the method of resetting a valve such as that shown in FIGS. 2 and 3.

Referring now to FIG. 4, reference numeral 42 denotes a conventional main of the type commonly used in natural gas distribution. Service line 44 is connected to the main and valve 46 is installed in line 44, preferably in an underground location relatively near main 42. Meter 48 is provided in line 44 in conventional fashion and the gas is supplied to one or more appliances, diagrammatically indicated by block 50, such as stoves, furnaces, various types of heaters, etc.

Valve 46 is of the type described in connection with FIGS. 2 and 3 wherein a permanent magnet is utilized to maintain the closure element in the closed position, once having been moved thereto by excess flow. Valve 46 preferably incorporates only a single movable element normally maintained in the open position with respect to the fixed valve seat by gravity and having a downwardly directed, flow responsive surface, not necessarily identical to that of the FIGS. 2 and 3 embodiment but nonetheless adapted to operate under conditions of relatively low pressure of the gas flowing through line 44.

Valve 46 is installed as indicated in line 44, in the open position, remaining so until an excess flow rate occurs and moves the closure element against the valve seat to block further flow. When the condition which resulted in the excess flow rate has been discovered and corrected, valve 46 may be reset to the open position to allow normal flow to resume. According to the present invention, this is accomplished by applying a back pressure, i.e., a pressure from the normal downstream toward the upstream side of valve 46, upon the valve closure element. The back pressure may be applied by any convenient means external to line 44, and at any point downstream of the valve where access to line 44 is provided. For example, a small, hand-held cylinder of pressurized gas, such as that indicated by reference number 52, may be placed with its outlet nozzle over a gas outlet orifice in appliance 50. Release of pressurized gas from cylinder 52 will provide the necessary pressure for overcoming the magnetic attraction holding the closure element of valve 46 in the closed position, resulting in immediate reset of the valve to the normal operating position. The magnitude of back pressure required for reset will be a function of the line pressure exerted on the inlet side of closure element 27, as well as the magnetic attractive force, which in turn is dependent on the size of the magnet and magnetically permeable material and the spacing therebetween, if any, when in the closed position.

In applications where pressure regulators are used in the line, the back pressure for resetting the valve should be applied at a point between the regulator and the valve.

It is preferred that some physical spacing be provided between the opposing surfaces of element 33 and magnet 36 when closure element 27 is in the fully closed position. This offers the advantages of permitting higher tolerances in the positioning of the elements and further decreases any possibility of malfunction due to chips or other small particles collecting on magnet 36.

What is claimed is:

1. An automatic shut-off valve operable to seal off flow in a fluid supply line in response to the rate of flow exceeding a predetermined value, said valve comprising, in combination:
   (a) a valve body having inlet and outlet ends with a fixed valve seat therebetween;
   (b) a flow control chamber between said inlet end and said valve seat defined by an interior wall of said valve body;
   (c) a closure element movable between open and closed positions relative to said seat;
   (d) means supporting said closure element within said chamber in a position between said inlet end and said valve seat;
   (e) a permanent magnet associated with one and a magnetically permeable material with the other of said closure element and said valve body, said magnet and material being so arranged that the attractive force exerted by said magnet on said material is insufficient to move said closure element when the latter is in said open position, and is sufficient to maintain said closure element in said closed position when moved thereto by said excess flow rate, until reset to said open position; and
   (f) said closure element including a plug tapering downwardly and outwardly from its upper end and having an upwardly disposed surface spaced from said seat when in said open position and in engagement with said seat when in said closed position, and a downwardly disposed surface likewise tapering downwardly and outwardly from its upper end and fully exposed to fluid flow through said flow control chamber, whereby said closure element is maintained by gravity on said support means until moved to engage said upwardly disposed surface with said valve seat by a flow rate in excess of said predetermined value by fluid flow acting on said downwardly disposed surface.

2. The invention according to claim 1 wherein said magnet is fixedly secured within said valve body on the outlet side of said valve seat and said magnetically permeable material is associated with said closure element.

3. The invention according to claim 1 wherein said magnet and said closure element are spaced from one another when the latter is in said closed position.

4. An automatic shut-off valve operable to seal off flow in a fluid supply line in response to the rate of flow exceeding a predetermined value, said valve comprising, in combination:
   (a) a valve body having inlet and outlet ends with a fixed valve seat therebetween;

(b) a flow control chamber between said inlet end and said valve seat defined by an interior wall of said valve body;

(c) a control and closure element movable between open and closed positions relative to said seat;

(d) means supporting said control and closure element within said chamber in a position between said inlet end and said valve seat; and (e) said control and closure element including a plug having an upwardly disposed surface tapering downwardly and outwardly from its upper end and spaced from said seat when in said open position and in engagement with said seat when in said closed position, and a downwardly disposed surface likewise tapering downwardly and outwardly from its upper end and fully exposed to fluid flow through said flow control chamber, said tapered surfaces constituting the sole flow-responsive means by which said plug is moved between said open and closed positions, whereby said control and closure element is maintained by gravity on said support means until moved to engage said upwardly disposed surface with said valve seat by a flow rate in excess of said predetermined value by fluid flow acting on said downwardly disposed surface and maintained in said closed position by fluid pressure on said downwardly disposed surface until returned by gravity to said support means upon equalizing the pressure on said closure element on opposite sides of said valve seat;

(f) a heat conducting material forming a wall portion of said flow control chamber; and (g) spring means retained in an initial position by a fusible material in contact with an interior surface of the heat conducting wall of said flow control chamber, the exterior surface of which is exposed to the atmosphere surrounding the valve, said spring means being released by application of a predetermined degree of heat to said exterior surface which is conducted directly through said wall to said fusible material, said spring means moving upon release to move said closure element to said closed position.

5. The invention according to claim 4 wherein said flow control chamber includes an inlet port in a side wall thereof, whereby flow into said chamber is in a substantially horizontal direction, said valve seat is disposed above said inlet port, and said fusible material is disposed entirely below said inlet port, whereby said fusible material is not directly in the path of fluid flow through said chamber.

6. The method of operating a safety shut-off valve having a closure element movable from an open to a closed position with respect to a fixed valve seat in response to a predetermined rate of flow of fluid acting upwardly on said element, said method comprising:

(a) fixedly positioning a permanent magnet with respect to one and a magnetically permeable material with respect to the other of the movable closure element and the valve seat;

(b) installing the valve in a fluid flow line;

(c) said magnet and material being so arranged that the attractive force of the magnet is insufficient to move the closure element from its open to its closed position, and is sufficient to maintain the closure element in its closed position upon movement thereto in response to said predetermined rate of flow, said attractive force being of known value at least great enough for preventing movement of the closure element away from the closed position by normal back pressure generated upon valve closure on the downstream side of the valve;

(d) exposing the closure element to a flow rate on the inlet side sufficient to move it from the open to the closed position; and (e) applying at a point downstream from the valve, by external means, a back pressure at least equal to said known value and thereby sufficient to move the closure element away from its closed and back to its open position.

7. The invention according to claim 6 wherein said valve is installed in a physically inaccessible location.

8. The invention according to claim 7 wherein said location is below ground level.

9. The invention according to claim 6 wherein said magnet and closure element are so arranged as to be physically spaced from one another when said closure element is in the closed position, said known value being a function of the physical spacing and thereby controllable prior to installation of said valve to establish said known value, and thereby the back pressure applied by said external means at any desired level.

* * * * *